3,394,160
CYCLOPOLYSILOXANES
Tse C. Wu, Waterford, N.Y., assignor to General Electric
  Company, a corporation of New York
No Drawing. Filed Dec. 28, 1964, Ser. No. 421,637
            8 Claims. (Cl. 260—448.2)

ABSTRACT OF THE DISCLOSURE

Cyclotrisiloxanes containing two ditolylsiloxane units and one other diorganosiloxane unit are encompassed by the formula:

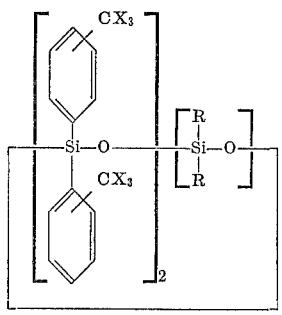

where R is a monovalent organic radical and X is selected from the group consisting of H and F. A compound within the scope of the present disclosure is prepared by reacting

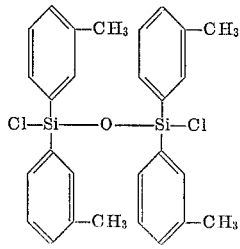

with

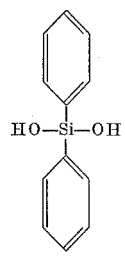

Cyclotrisiloxanes within the scope of the present disclosure can be polymerized to form polysiloxane elastomers.

---

This invention relates to cyclopolysiloxanes. More particularly, it relates to hexaorganocyclotrisiloxanes having at least four tolyl substituents and having the generic formula:

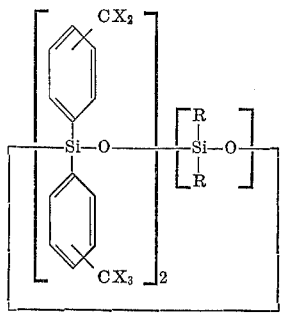

where R is a monovalent organic radical and X is selected from the group consisting of H and F.

The cyclic organopolysiloxanes have been found particularly valuable in the formation of organopolysiloxanes, especially long-chain polymers. Exemplary of these long-chain polymer raw materials which have proven invaluable are octamethylcyclotetrasiloxanes and hexaphenylcyclotrisiloxane. While long-chain polymers formed from these materials are extremely useful, they are subject to certain limitations. Polymers formed from the octamethylcyclotetrasiloxane are not stable at high temperatures, while long-chain polymers formed from hexaphenylcyclotrisiloxane have a tendency to be extremely brittle. Extremely valuable organopolysiloxane materials can be formed by incorporating tolyl radicals along the chain. Such properties as improved flexibility and improved heat-stability are obtained. It is an object of this invention to provide cyclotrisiloxanes having at least four tolyl substituents, the other two organic substituents being different from the four tolyl substituents.

Briefly, the present invention relates to hexaorganocyclotrisiloxanes of the formula:

(2)

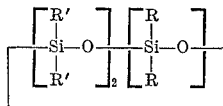

where R' is a tolyl radical or substituted tolyl radical and R is a different monovalent organic substituent. The R' radical can be any of the isomeric tolyl radicals, o-tolyl, m-tolyl, p-tolyl, or the trifluoromethylphenyl radicals, ortho-, meta-, or para-. The monovalent organic radical represented by R can be selected from a wide variety of substituents. For example, it can be a tolyl radical which is isomerically different, in a particular compound, from the tolyl radical represented by R'. Additionally, R can represent alkyl radicals, such as methyl, ethyl, propyl, butyl, octyl, dodecyl, isopropyl, isobutyl, etc.; cycloalkyl radicals, such as cyclohexyl, cyclopentyl, cycloheptyl, etc.; aryl radicals, such as phenyl, biphenyl, naphthyl, benzoylphenyl, para-phenoxy phenyl, xylyl, etc.; aralkyl radicals, such as benzyl, phenethyl, etc.; alkenyl radicals, such as vinyl, allyl, etc.; and substituted monovalent hydrocarbon radicals, including halogenated hydrocarbon radicals, such as chloromethyl, dibromophenyl, γ-γ-γ-trifluoropropyl, etc.; and cyanoalkyl radicals, such as cyanomethyl, alpha-cyanoethyl, beta-cyanoethyl, beta-cyanopropyl, gamma-cyanopropyl, delta-cyanobutyl, cyanophenyl, etc.

The cyclotrisiloxanes of the present invention are formed by the reaction of a first compound having the formula:

(3) $YR'_2Si-O-SiR'_2Y$ and a second compound having the formula:

(4) $R_2SiY_2$ in the presence of an acid acceptor and a solvent, where R' and R are as previously defined and Y is selected from the class consisting of hydroxyl radicals and chloride radicals. The product is formed by the dehydrochlorination of the various chloro and hydroxyl radicals, so that it is obvious that while either compound may have two chloro or two hydroxyl radicals, the radicals in one compound must be different from those in the other compound. Thus, the compound of Formula 3 can be sym-dichlorotetrakis-(m-trifluoromethylphenyl)disiloxane and the compound of Formula 4 diphenylsilanediol, or the compound of Formula 3 can by sym-tetrakis-(m-trifluoromethylphenyl)-disiloxanediol and the compound of Formula 4 diphenyldichlorosilane. The compounds of Formulas 3 and 4 react, in the case of a disiloxanediol and a diorganodichlorosilane, according to the equation:

(5)
$HOR'_2Si-O-SiR'_2OH + R_2SiCl_2 \longrightarrow$

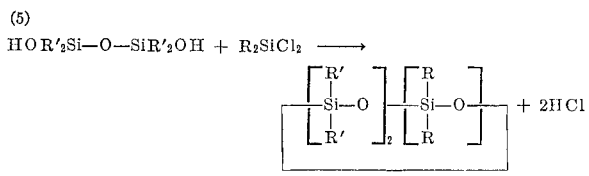

$+ 2HCl$

Obviously, the reaction between the dichlorodisiloxane and diorganosilonediol can be similarly represented.

The compounds of Formulas 3 and 4 should preferably be in the stoichiometric ratio of 1:1. However, either of the components can be present in an amount 5% in excess of the stoichiometric ratio. Since the disiloxanediol is more soluble in the preferred solvents than the diorganosilanediol, the disiloxanediol is preferably reactant. However, it must be realized that since the disiloxanediol is generally prepared from the dichlorodisiloxane, one extra step is then involved in the preparation. In some cases, as when R in Formula 4 is methyl, the only available reactant is the dimethyldichlorosilane. Obviously, therefore, in such a case the disiloxanediol of Formula 3 must be utilized.

The reaction should be run in the presence of a solvent, and more preferably in dilute solution. Since it is possible for the combination of compounds 3 and 4 to form either cyclopolysiloxanes or straight-chain organopolysiloxanes, the conditions must be established to favor formation of the cyclics. The more dilute the solution, the more the formation of cyclics is favored. Thus, the final concentration should be limited to no more than about 2 moles of total reactant per liter of solvent, preferably no more than 0.5 mole of total reactant per liter of solvent. The reaction is preferably accomplished by dissolving the compound of Formula 3 in a portion of the solvent, the compound of Formula 4 in a separate portion, and adding the two solutions simultaneously to a third portion of the solvent.

The solvents which can be utilized are essentially any organic solvent which is inert to the reactants under the conditions of the reaction. However, the preferred solvents are the hydrocarbons, such as benzene, toluene, xylene, pentane, hexane, heptane, etc. Polar solvents, such as the ethers and ketones, are usable, but do not provide as high a yield, since they keep the acid acceptor-hydrogen chloride salt in solution during the process. Any of the utilizable solvents can be mixed, that is, one solvent may be used for one of the reactants and a different solvent for the other reactant.

Preferably, the reactant solutions are added simultaneously to the reaction vessel, so as to keep the concentration of reactants as low as possible. The acid acceptor is generally placed in the portion of the solvent to which the reactants are added. However, some of the diorganosilanediols are relatively insoluble, in which case the acid acceptor can be added to the solvent solution containing the diorganosilanediol reactant.

The acid acceptor which should be utilized can be selected from any of the well-known weak bases which are used as acid acceptors in similar reactions. For example, the tertiary amines, such as pyridine, picoline, 1,4-diazabicycle(2,2,2)-octane, and the dialkyl anilines can be utilized. As one mole of hydrogen chloride is generated for each mole of reactant, at least one mole of acid acceptor must be present per mole of total reactant. However, it is preferable to employ the acid acceptor in an amount of from 20 percent to 150 percent in excess of the stoichiometric requirement.

The reaction can be accomplished at any temperature between about 10° C. and the reflux temperature of the reaction mixture. Preferably, the reaction is run at room temperature for convenience and because the reaction is accomplished so quickly, even at room temperature.

The reactants are added slowly to prevent too great a concentration in solution. The addition should be completed over a period of time of no less than ½ hour. There is no maximum addition time, except as limited by economics. Following addition, the reaction mixture is stirred for two or more hours to assure completion of the reaction.

After the reaction is completed, the solvent is removed by evaporation and the resultant compound is further purified. As most of the cyclic organopolysiloxanes of the present invention are solids at room temperature, purification is accomplished by recrystallization. Exemplary of the solvents which can be utilized for the recrystallization are pentone, petroleum ether, hexane, and cyclohexane, for compounds melting below 120° C., and toluene, for the higher melting compounds. Those compounds which are liquid at room temperature can be purified by vacuum distillation.

The sym-dichlorotetratolyldisiloxane utilized in the following example is prepared by the controlled, partial hydryolsis of the corresponding ditolyldichlorosilane. Stoichiometric amounts of the ditolyldichlorosilane and water are reacted, at an elevated temperature, in the presence of sufficient amine acid-acceptor to act as a promoter, but insufficient amounts of the amine to completely absorb the hydrogen chloride generated in the reaction. For example, 84.4 g. (0.3 mole) of dichloro-di-m-tolylsilane and 2.7 ml. (0.15 mole) of water were reacted at 85° C. in the presence of 50 ml. of toluene and 3.3 ml. (0.04 mole) of pyridine. The product was then purified by fractional distillation to yield a product boiling at 234°–235° C. at 0.01 mm. The sym-tetra-tolyldisiloxanediol utilized is prepared from the corresponding sym-dichloro-tetra-tolyldisiloxane. For example 29.7 g. of the dichlorodisiloxane in 100 ml. of diethylether are added to a reaction vessel containing 30 g. of sodium bicarbonate and 150 ml. of diethyl ether. The solids formed during the reaction are evaporated, the solvent removed from the filtrate, the residue washed with hexane, and, if desired, further purified by recrystallization from hexane to yield crystals melting at 68.5°–69.5° C.

The di-o-tolylsilanediol used in two of the examples was prepared from the corresponding dichloro-di-o-tolylsilane. As an example, 70.3 g. (0.25 mole) of di-o-tolyl-dichlorosilane in 300 ml. of diethylether were added over a period of two hours to a reaction flask containing 50 g. (0.6 mole) of sodium bicarbonate, 300 ml. of diethylether, and 0.5 g. (0.25 mole) of water, with stirring. The product was filtered, the solvent evaporated, and the resulting solids recrystallized in hexane to yield 51.5 g., an 85% yield based on the theoretical, of crystals melting at 136.5°–138.5° C.

The preparation of the compounds of the present invention will now be described in greater detail. These examples should be considered as illustrative only and not as limiting in any way the full scope of the present invention as covered in the appended claims.

Preparation of 1,1-diphenyl-3,3,5,5-tetra-m-tolylcyclotrisiloxane

Example 1.—Into a reaction flask fitted with two dropping funnels was placed 400 ml. of benzene. In one of the dropping funnels were placed 210 ml. of benzene, 8.7 g. (0.04 mole) of diphenylsilanediol, and 10 ml. (0.12 mole) of pyridine. Into the other funnel was placed an equal volume of benzene solution containing 20.3 g. (0.04 mole) of sym-dichlorotetra-m-tolyl-disiloxane. The two solutions were added to the reaction vessel at the same rate over a period of about two hours, with stirring, and the total mixture was then agitated for a period of three hours, all at room temperature. A water-soluble solid formed which was filtered off and the solvent was removed from the filtrate, first by flash evaporation and then by evacuation. The remaining sirupy residue was washed with toluene. This solution was filtered to remove more of the water-soluble solids and the toluene was removed from the filtrate by distillation.

An impure product was obtained by distillation in a micro-still under high vacuum. The product distilled at 0.02 mm. at a temperature of from 284° to 286° C. in an amount of 14.5 g., 56% yield based on the theoretical. An infrared spectrum was run on this impure product and, showed bands at 9.85 microns, indicative of the cyclotrisiloxane structure, 7.0 and 13.9 microns, indicative of the diphenylsiloxy units, and 14.3 microns, indicative of the m-tolyl substituents. This was consistent with the desired structure:

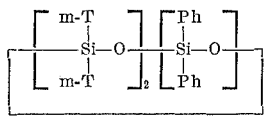

where Ph is the phenyl radical and m-T is the meta-tolyl radical. The impure product was recrystallized twice from hot pentane and refrigerated to yield 9.6 g., a 37% yield based on the theoretical, of colorless crystals melting at 83–84° C.

Example 2.—The same equipment was used and the same procedure followed as in Example 1. A liter of a first solution containing benzene and 91.1 g. (0.18 mole) of sym-dichloro-tetra-m-tolyldisiloxane and a second warmed solution of equal volume, containing benzene, 38.9 g. (0.18 mole) of diphenylsilanediol, and 50 ml. (0.62 mole) of pyridine were added at the same rate to a reaction vessel containing 1500 ml. of benzene over a period of about four hours, with stirring. On completion of the addition, the reaction mixture was stirred for an additional two hours, all at room temperature. The crude product was obtained by the same procedure used in Example 1, and yielded 64.4 g., 40% based on the theoretical, of crystals melting at 81–83° C. The crude crystals were purified by the same procedure as used in Example 1, utilizing petroleum ether containing 3 percent benzene. This yielded shiny, transparent prisms melting at 83°–84° C. in an amount of 30.5 g., 26% based on the theoretical. By infrared spectrometry, the structure shown in Example 1 was confirmed.

Example 3.—The same procedure and equipment as in the previous two examples was utilized here. A first solution containing 300 ml. of benzene, 50 ml. (0.62 mole) of pyridine, and 48.5 g. (0.224 mole) of diphenylsilanediol and a second solution of equal volume, containing 113.9 g. (0.224 mole) of sym-dichlorotetra-m-tolyldisiloxane in benzene were simultaneously added to 350 ml. of dry benzene placed in a reaction vessel, over a period of about one hour, an stirring was continued for 3 hours after the addition, all at room temperature. Following recrystallization from pentane, 48.8 g., 33.5% based on the theoretical, of crystals melting at 82.5°–84° C. were obtained. The structure of this product was confirmed as the same as that of Example 1 by an infrared spectrum.

Preparation of 1,1-diphenyl-3,3,5,-tetrakis-(m-trifluoromethylphenyl)cyclotrisiloxane Example 4.—The procedure and equipment utilized in this example were the same as those utilized in Example 1. A first 200 ml. solution containing 24.7 g. (0.034 mole) of sym - dichlorotetrakis - (m - trifluoromethylphenyl) disiloxane in benzene and a second 200 ml. solution containing 8 ml. (0.1 mole) of pyridine and 7.4 g. (0.034 mole) of diphenylsilanediol in benzene were simultaneously added to a reaction vessel containing 200 ml. of dry benzene over a period of 1 hour, with stirring. Stirring was continued for a period of nine hours following the addition, all at room temperature. The product was distilled at 0.02 mm. at 264–280° C., was washed with petroleum ether, and filtered to give 13 g., 44% based on the theoretical, of solids melting at 105–111° C. After two recrystallizations from pentane, 8.2 g., 28% based on the theoretical, of pure solids melting at 111.5°–113° C. were obtained of a product having the formula:

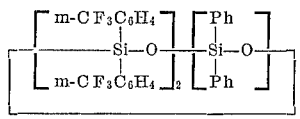

where Ph again represents the phenyl radical.

Example 5.—The procedure followed in this example was the same as that in Example 1. A first solution containing 300 ml. of benzene and 17.2 g. (0.025 mole) of sym - tetrakis(m - trifluoromethylphenyl)disiloxanediol and a second solution, of equal volume, containing 6.3 g. (0.025 mole) of diphenyldichlorosilane in benzene were simultaneously added to a reaction vessel containing 200 ml. of benzene and 6 ml. (0.075 mole) of pyridine over a period of one hour, with stirring. The resulting slurry was stirred for an additional three hours, all at room temperature. A crude yield of 16.4 g., 76% based on the theoretical, of solids melting at 107–113° C. was obtained following distillation. The product corresponds with that of Example 4 following recrystallization.

Preparation of 1,1-di-o-tolyl-3,3,5,5-tetra-m-tolylcyclotrisiloxane

Example 6.—The same procedure was followed and equipment utilized for this preparation as in Example 1. A first 200 ml. solution containing 10 ml. (0.12 mole) of pyridine and 9.7 g. (0.04 mole) of di-o-tolylsilanediol, and in benzene a second 200 ml. solution containing 20.3 g. (0.04 mole) of sym-dichlorotetra-m-tolyldisiloxane in benzene were simultaneously added to a reaction vessel containing 400 ml. of benzene over a two hour period, with stirring. The reaction mixture was stirred for an additional three hours, at room temperature, following the addition. Following a toluene wash, the product was distilled at a temperature of 284–286° C. at 0.03 mm. The yield was 14.9 g., 55% based on the theoretical, of a product, the infrared spectrum of which was consistent with the structure:

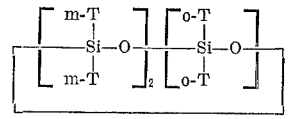

where m-T is the meta-tolyl radical and o-T is the ortho-tolyl radical.

Preparation of 1,1-diphenyl-3,3,5,5-tetra-p-tolyl-cyclotrisiloxane

Example 7.—The equipment used and procedure followed in this example were the same as in the previous examples. A first 100 ml. solution containing 23.5 g. (0.05 mole) of sym-tetra-p-tolyldisiloxanediol in benzene and a second 100 ml. solution containing 12.7 g. (0.05 mole) of diphenyldichlorosilane in benzene were simultaneously added to a reaction vessel containing 200 ml. of benzene and 10 ml. (0.12 mole) of pyridine over a period of 1.5 hours, with stirring. The reaction mixture was stirred for and additional 7.5 hours after addition was completed, all at room temperature. Following washing the ethanol and several recrystallizations from ethyl acetate, 5.7 g., 17.5% based on the theoretical, of solids melting at 213°–215° C. were obtained. The infrared spectrum, with strong bands at 9.9 microns, indicative of a cyclotrisiloxane structure, and 12.4 and 13.85 microns, indicative of a p-tolyl substituent, was consistent with the structure:

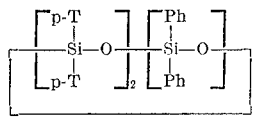

where p-T is the para-tolyl radical and Ph is the phenyl radical.

Preparation of 1,1-dimethyl-3,3,5,5-tetra-p-tolyl-cyclotrisiloxane

Example 8.—The equipment used and the procedure followed were the same as those in the previous examples. A first solution containing 250 ml. of benzene and 23.5 g. (0.05 mole) of sym-tetra-p-tolyldisiloxanediol and a second solution, of equal volume, containing 6.5 g. (0.05 mole) of dimethyldichlorosilane in benzene were simultaneously added to a reaction vessel containing 250 ml. of benzene and 15 ml. (0.19 mole) of pyridine over a period of one hour, with stirring. The reaction mixture was stirred for an additional 16 hours after completion of the addition, all at room temperature. Following filtration and washes with toluene and ethanol, 20.3 g., 77% based on the theoretical, of solids melting at 97°–104° C. were obtained. Following successive recrystallizations from a solvent containing equal parts, by volume, of ethanol and hexane, 13.6 g., 52% based on the theoretical of purified crystals melting at 104–105.5° C., were obtained of a product having the structure:

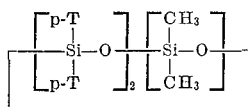

where p-T is the para-tolyl radical.

Example 9.—The same equipment was used and the same procedure followed as in the previous examples. A first 500 ml. solution containing 70.6 g. (0.15 mole) of sym-tetra-p-tolyl-disiloxanediol in benzene and a second 500 ml. solution containing 19.4 g. (0.15 mole) of dimethyldichlorosilane in benzene were simultaneously added to a reaction vessel containing 750 ml. of benzene and 40 ml. of pyridine (0.5 mole) over a period of 2 hours and 10 minutes, with stirring. The reaction mixture was stirred for an additional 11 hours, all at room temperature. Following filtration, washing, and recrystallization as in Example 8, 9.4 g., 12% based on the theoretical, of crystals melting at 104.5–106° C. were obtained of the same product as in Example 8.

Example 10.—The same equipment was used and the same procedure followed as in the preceding examples. A first solution containing 400 ml. of benzene and 56.5 g. (0.12 mole) of sym-tetra-p-tolyldisiloxanediol and a second solution containing 400 ml. of benzene and 15.5 g. (0.12 mole) of dimethyldichlorosilane were simultaneously added to a reaction vessel containing 500 ml. of benzene and 30 ml. (0.38 mole) of pyridine over a period of 3 hours and 15 minutes, with stirring. The reaction mixture was stirred for an additional 6 hours and 45 minutes following the addition, all at room temperature. Following filtration, distillation, and washing in ethanol, 49.5 g., 78% based on the theoretical, of crude solid melting at 99–103° C. was obtained. After several recrystallizations from hexane, a pure product weighing 10.9 g., 17% based on the theoretical, of crystals melting at 104.5°–106° C. were obtained of the product of Example 8.

Preparation of 1,1-dimethyl-3,3,5,5-tetra-m-tolyl cyclotrisiloxane

Example 11.—The same procedure was followed and the same equipment utilized as in the preceding examples. A first 250 ml. solution containing 35.3 g. (0.075 mole) of sym-tetra-m-tolyldisiloxanediol in benzene and a second 250 ml. solution containing 9.7 g. (0.075 mole) of dimethyldichlorosilane in benzene were simultaneously added to a reaction vessel containing 375 ml. of dry benzene and 20 ml. (0.25 mole) of pyridine over a period of 2 hours and 20 minutes, with stirring. The reaction mixture was stirred for an additional 7 hours and 40 minutes after completion of the addition, all at room temperature. A product boiling at 192°–202° C. at 0.02 mm. was obtained. The product is a liquid at room temperature, not beginning to crystallize until −20° C. An infrared spectrum was run on the product and was consistent with the structure:

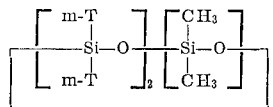

where m-T is the meta-tolyl radical.

Preparation of 1,1-di-o-tolyl-3,3,5,5-tetra-p-tolylcyclotrisiloxane

Example 12.—In this example, the same equipment was utilized and the same procedure followed as in the preceding examples. A first solution containing 75 ml. of benzene and 10.2 g. (0.02 mole) of sym-dichlorotetra-p-tolyldisiloxane and a secod solution containing 75 ml. of diethylether and 4.9 g. (0.02 mole) of di-o-tolylsilanediol were simultaneously added to a reaction vessel containing 150 ml. of benzene and 8 ml. (0.1 mole) of pyridine, over a period of 30 minutes, with stirring. The reaction mixture was stirred for two additional hours following completion of the reaction, all at room temperature. Following filtration, drying, and washing, 11.2 g., 82% yield based on the theoretical, of solids melting at 170–179° C. were obtained. The solids were recrystallized from cyclohexane several times and yielded 2.6 g., 19% yield based on the theoretical, of pure crystals melting at 179–180° C. An infrared spectrum of the crystals was run and was consistent with the structure:

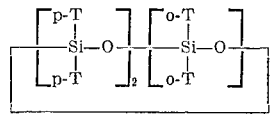

where p-T is the para-tolyl radical and o-T is the ortho-tolyl radical.

Thus, a variety of cyclotrisiloxanes containing at least four tolyl or substituted tolyl substituents have been shown. In each case, the other two organo-substituents are different from the first four substituents in that they are either a different tolyl isomer or an entirely different monovalent organic radical. These cyclic organopolysiloxanes are valuable in the formation of organopolysiloxane elastomers and resins and can be used in amounts of from 1% to 100% of the elastomer which can contain up to 99% of other siloxane units. For example, when one of the cyclotrisiloxanes of the present invention is combined with phenylsubstituted diorganopolysiloxanes, an elastomer which is both flexible and resistant to high temperatures is obtained.

While specific embodiments of the invention have been

What I claim as new and desire to secure by Letters Patent of the United States is:

1. A cyclotrisiloxane composition of the structure:

$$\left[\begin{array}{c} CX_3 \\ \mid \\ \text{Si—O} \\ \mid \\ CX_3 \end{array}\right] \left[\begin{array}{c} R \\ \mid \\ \text{Si—O} \\ \mid \\ R \end{array}\right]_2$$

where R is a radical selected from the class consisting of alkyl radicals, cycloalkyl radicals, aryl radicals, aralkyl radicals, alkenyl radicals, halogenated monovalent hydrocarbon radicals and cyanoalkyl radicals, and X is selected from the group consisting of H and F.

2. The cyclotrisiloxane composition:

$$\left[\begin{array}{c} m\text{-}T \\ \mid \\ \text{Si—O} \\ \mid \\ m\text{-}T \end{array}\right]_2 \left[\begin{array}{c} Ph \\ \mid \\ \text{Si—O} \\ \mid \\ Ph \end{array}\right]$$

where m-T is the meta-tolyl radical, Ph is the phenyl radical.

3. The cylotrisiloxane composition:

$$\left[\begin{array}{c} m\text{-}CF_3C_6H_4 \\ \mid \\ \text{Si—O} \\ \mid \\ m\text{-}CF_3C_6H_4 \end{array}\right]_2 \left[\begin{array}{c} Ph \\ \mid \\ \text{Si—O} \\ \mid \\ Ph \end{array}\right]$$

where Ph is the phenyl radical.

4. The cyclotrisiloxane composition:

$$\left[\begin{array}{c} m\text{-}T \\ \mid \\ \text{Si—O} \\ \mid \\ m\text{-}T \end{array}\right]_2 \left[\begin{array}{c} o\text{-}T \\ \mid \\ \text{Si—O} \\ \mid \\ o\text{-}T \end{array}\right]$$

where m-T is the meta-tolyl radical and o-T is the ortho-tolyl radical.

5. The cyclotrisiloxane composition:

$$\left[\begin{array}{c} p\text{-}T \\ \mid \\ \text{Si—O} \\ \mid \\ p\text{-}T \end{array}\right]_2 \left[\begin{array}{c} Ph \\ \mid \\ \text{Si—O} \\ \mid \\ Ph \end{array}\right]$$

where p-T is the para-tolyl radical and Ph is the phenyl radical.

6. The cyclotrisiloxane composition:

$$\left[\begin{array}{c} p\text{-}T \\ \mid \\ \text{Si—O} \\ \mid \\ p\text{-}T \end{array}\right]_2 \left[\begin{array}{c} CH_3 \\ \mid \\ \text{Si—O} \\ \mid \\ CH_3 \end{array}\right]$$

where p-T is the para-tolyl radical.

7. The cyclotrisiloxane composition:

$$\left[\begin{array}{c} m\text{-}T \\ \mid \\ \text{Si—O} \\ \mid \\ m\text{-}T \end{array}\right]_2 \left[\begin{array}{c} CH_3 \\ \mid \\ \text{Si—O} \\ \mid \\ CH_3 \end{array}\right]$$

where m-T is the meta-tolyl radical.

8. The cyclotrisiloxane composition:

$$\left[\begin{array}{c} p\text{-}T \\ \mid \\ \text{Si—O} \\ \mid \\ p\text{-}T \end{array}\right]_2 \left[\begin{array}{c} o\text{-}T \\ \mid \\ \text{Si—O} \\ \mid \\ o\text{-}T \end{array}\right]$$

where p-T is the para-tolyl radical and o-T is the ortho-tolyl radical.

References Cited

UNITED STATES PATENTS 3,328,348   6/1967   Sporck _____ 260—448.2 XR

TOBIAS E. LEVOW, *Primary Examiner.*

P. F. SHAVER, *Assistant Examiner.*